United States Patent
Starr et al.

(10) Patent No.: US 7,627,310 B2
(45) Date of Patent: *Dec. 1, 2009

(54) METHODS, SYSTEMS, AND PRODUCTS FOR DISTANCE-BASED DISCOUNTING

(75) Inventors: Robert J. Starr, Decatur, GA (US); Samuel N. Zellner, Dunwoody, GA (US)

(73) Assignee: AT&T Intellectual Property I, L. P., Reno, NE (US)

(*) Notice: Subject to any disclaimer, the term of this patent is extended or adjusted under 35 U.S.C. 154(b) by 68 days.

This patent is subject to a terminal disclaimer.

(21) Appl. No.: 11/095,362

(22) Filed: Mar. 31, 2005

(65) Prior Publication Data

US 2006/0223508 A1 Oct. 5, 2006

(51) Int. Cl.
 *H04M 3/493* (2006.01)
(52) U.S. Cl. ........................ 455/414.2; 705/14
(58) Field of Classification Search .............. 455/414.2; 705/14

See application file for complete search history.

(56) References Cited

U.S. PATENT DOCUMENTS

| | | | | |
|---|---|---|---|---|
| 5,579,535 | A * | 11/1996 | Orlen et al. ................. | 455/421 |
| 5,612,881 | A * | 3/1997 | Moroto et al. .............. | 701/209 |
| 5,930,699 | A * | 7/1999 | Bhatia ..................... | 455/456.3 |
| 5,991,749 | A * | 11/1999 | Morrill, Jr. .................. | 705/44 |
| 6,091,956 | A * | 7/2000 | Hollenberg ............... | 455/456.5 |
| 6,108,533 | A * | 8/2000 | Brohoff .................... | 455/414.3 |
| 6,169,894 | B1 | 1/2001 | McCormick | |
| 6,185,501 | B1 * | 2/2001 | Smith et al. ................ | 701/200 |
| 6,198,894 | B1 * | 3/2001 | Park .......................... | 399/249 |
| 6,199,045 | B1 | 3/2001 | Giniger | |
| 6,199,066 | B1 * | 3/2001 | Glitho et al. .................. | 707/10 |
| 6,212,506 | B1 * | 4/2001 | Shah et al. .................. | 705/418 |
| 6,237,145 | B1 * | 5/2001 | Narasimhan et al. .......... | 725/23 |
| 6,341,270 | B1 * | 1/2002 | Esposito et al. ............... | 705/26 |
| 6,386,450 | B1 * | 5/2002 | Ogasawara .................. | 235/383 |
| 6,529,159 | B1 * | 3/2003 | Fan et al. ................. | 342/357.09 |
| 6,633,809 | B1 * | 10/2003 | Aizono et al. ................ | 701/200 |
| 6,677,894 | B2 | 1/2004 | Sheynblat | |
| 6,826,598 | B1 * | 11/2004 | Titmuss et al. ............... | 709/212 |
| 6,934,684 | B2 * | 8/2005 | Alpdemir et al. ............. | 704/265 |
| 6,947,754 | B2 * | 9/2005 | Ogasawara ............... | 455/456.3 |
| 6,970,871 | B1 * | 11/2005 | Rayburn ....................... | 707/10 |
| 7,071,842 | B1 * | 7/2006 | Brady, Jr. .................... | 340/988 |
| 7,181,529 | B2 * | 2/2007 | Bhatia et al. ................ | 709/238 |
| 7,225,143 | B1 * | 5/2007 | Kepecs .......................... | 705/14 |
| 7,243,075 | B1 * | 7/2007 | Shaffer et al. .................. | 705/10 |
| 7,277,715 | B2 * | 10/2007 | Starr et al. ............... | 455/456.1 |
| 2002/0046299 | A1 * | 4/2002 | Lefeber et al. ............. | 709/318 |
| 2002/0060246 | A1 * | 5/2002 | Gobburu et al. ........ | 235/462.46 |
| 2002/0102993 | A1 * | 8/2002 | Hendrey et al. ............. | 455/456 |
| 2002/0160761 | A1 * | 10/2002 | Wolfe ......................... | 455/414 |

(Continued)

*Primary Examiner*—Lester Kincaid
*Assistant Examiner*—Diego Herrera
(74) *Attorney, Agent, or Firm*—Scott P. Zimmerman PLLC (57) ABSTRACT

Methods, systems, and computer program products are disclosed for providing a discount to a wireless device. One method obtains a location of the wireless device and retrieves the discount from memory. The discount is based on the location, and the discount increases as a distance from a reference location increases. The reference location may represent any location, such as a physical location of a merchant. As the distance between the wireless device and the merchant's physical location increases, the merchant provides a greater discount to entice the wireless customer to travel to the merchant.

20 Claims, 10 Drawing Sheets

U.S. PATENT DOCUMENTS

| | | | |
|---|---|---|---|
| 2002/0161640 A1* | 10/2002 | Wolfe | 705/14 |
| 2002/0183070 A1* | 12/2002 | Bloebaum et al. | 455/456 |
| 2003/0083949 A1* | 5/2003 | Kar | 705/26 |
| 2003/0093314 A1* | 5/2003 | Leung et al. | 705/14 |
| 2003/0100315 A1* | 5/2003 | Rankin | 455/456 |
| 2003/0134648 A1* | 7/2003 | Reed et al. | 455/456 |
| 2003/0154125 A1* | 8/2003 | Mittal et al. | 705/14 |
| 2003/0233278 A1* | 12/2003 | Marshall | 705/14 |
| 2004/0036622 A1* | 2/2004 | Dukach et al. | 340/691.6 |
| 2004/0203847 A1* | 10/2004 | Knauerhase et al. | 455/456.1 |
| 2004/0242332 A1* | 12/2004 | Walker et al. | 463/42 |
| 2004/0260605 A1* | 12/2004 | McIntyre et al. | 705/14 |

* cited by examiner

METHODS, SYSTEMS, AND PRODUCTS FOR DISTANCE-BASED DISCOUNTING

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to telecommunications and to data processing. This application, more particularly, relates to location monitoring within a radiotelephone system.

Location-based services for wireless devices are known in the art. A wireless device's location is determined (usually via triangulation or a global positioning system) and then information is provided based on that location. Advertising, for example, can be based on location. Once the location of a wireless device is known, local restaurants and merchants may wish to provide targeted advertising to the wireless device. Coupons may even be sent to the wireless device to entice the wireless customer to purchase.

U.S. Pat. No. 6,108,533 to Brohoff (Aug. 22, 2000) (incorporated herein by reference) provides an example. A service area of a wireless network is divided into geographic zones. When a wireless device issues a search query, the network first determines the location of the wireless device. A search is performed based on the search query, and search results are returned to the wireless device. The search results, however, are sorted according to the location of the wireless device. If, for example, the wireless customer issues a generalized search query for "food," the search results are arranged according to those restaurants located within the geographic zone of the wireless device.

U.S. Pat. No. 6,169,894 to McCormick et aL (Jan. 2, 2001) (incorporated herein by reference) is an example of geographic broadcasting. This patent describes broadcasting information that is specific to a geographic region. Local traffic reports, sightseeing points of interest, weather conditions, tourist information, and local commercials are examples of information that is specifically broadcast to a limited geographic region.

Several other documents discuss location-based information. U.S. Pat. No. 6,199,045 to Giniger et al. (Mar. 6, 2001), U.S. Pat. No. 6,529,159 to Fan et al. (Mar. 4, 2003), U.S. Pat. No. 6,677,894 to Sheynblat et al. (Jan. 13, 2004), and published U.S. Patent Application 2003/0134648 to Reed et al. (pub. Jul. 17, 2003) (and all incorporated herein by reference) provide examples of location-based information. These documents all discuss various schemes of providing information to a wireless device, and the information is based on the location of the wireless device. The information may be tailored to the interests of the wireless customer. The information may be local advertisements and/or coupons. If the wireless device requests information, search results are returned that are within local reach and not across the continent.

Despite all these known location-based services, a fundamental concept has eluded the prior art. As the wireless customer travels further from a merchant, conventional advertising and marketing strategies are less successful. A wireless customer that is located farther away from a merchant is less likely to travel and to purchase from the merchant. That is, a wireless customer that is in the vicinity of a merchant's store is more likely to respond to the location-based advertisement. If the wireless customer is presently located many miles from the merchant, the location-based advertisement may not entice the wireless customer to drive to the merchant. What is needed, then, is a strategy for providing location-based services that provides a greater enticement depending on the distance a wireless customer must travel.

SUMMARY

The aforementioned problems, and other problems, are reduced, according to the exemplary embodiments, using discounts based on location. These discounts, however, increase as a distance from a reference location increases. A merchant, for example, may wish to offer discounts to customers who must travel to the merchant's physical location. The merchant wishes to provide a greater discount to those customers who must travel a greater distance. This patent, therefore, describes concepts that provide a discount based on the distance between the customer's wireless device and the merchant's physical location. As the customer's wireless device travels further from the reference location (e.g., the merchant's physical location), the merchant provides a greater discount. The discount is meant to entice the wireless customer to travel to the merchant's physical location and make purchases. The farther the customer must travel, the greater the discount the merchant provides.

Distance, however, is only one factor that may determine the appropriate discount. Once the location of the customer's wireless device is known, the exemplary embodiments may acquire and use other information to determine whether a discount is necessary or even desirable. The exemplary embodiments, for example, may use a billing address to determine if a discount is needed. If the billing address has some attribute that indicates a wealthy demographic, perhaps no discount is needed to entice the wireless customer. The exemplary embodiments may also use historical location information and/or historical purchase information to determine if a discount is needed. If the historical location information indicates that the wireless device, and thus the wireless customer, frequently enters the store, perhaps no discount is necessary. If the historical purchase information indicates that the customer makes frequent purchases from the merchant, this historical purchase information may indicate that no discount, or a smaller discount, is needed. The historical location information and/or historical purchase information may help identify purchasing trends and help formulate pricing strategies.

According to the exemplary embodiments, methods, systems, and computer program products are disclosed for providing a discount to a wireless device. The location of the wireless device is obtained, and the discount is retrieved from memory. The discount is based on the location, such that the discount increases as a distance from a reference location increases. The reference location may represent any location, such as a physical location of a merchant. As the distance increases between the wireless device and the merchant's physical location, the merchant provides a greater discount. The discount is meant to entice the wireless customer to travel to the merchant. The farther the customer must travel, the greater the discount the merchant provides.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein.

DETAILED DESCRIPTION

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Those of ordinary skill in the art understand that the exemplary hardware, software, processes, methods, and/or operating systems described herein are for illustrative purposes and, thus, are not intended to be limited to any particular named manufacturer.

The exemplary embodiments describe methods, systems, and products for providing a discount to a wireless device. These discounts, however, increase as a distance from a reference location increases. A merchant, for example, may wish to offer discounts to customers who must travel to the merchant's physical location. The merchant wishes to provide a greater discount to those customers who must travel a greater distance. This patent, therefore, describes concepts that provide a discount based on the distance between the customer's wireless device and the merchant's physical location. As the customer's wireless device travels further from the reference location (e.g., the merchant's physical location), the merchant provides a greater discount. The discount is meant to entice the wireless customer to travel to the merchant's physical location and make purchases. The farther the customer must travel, the greater the discount the merchant provides.

Figure 1:
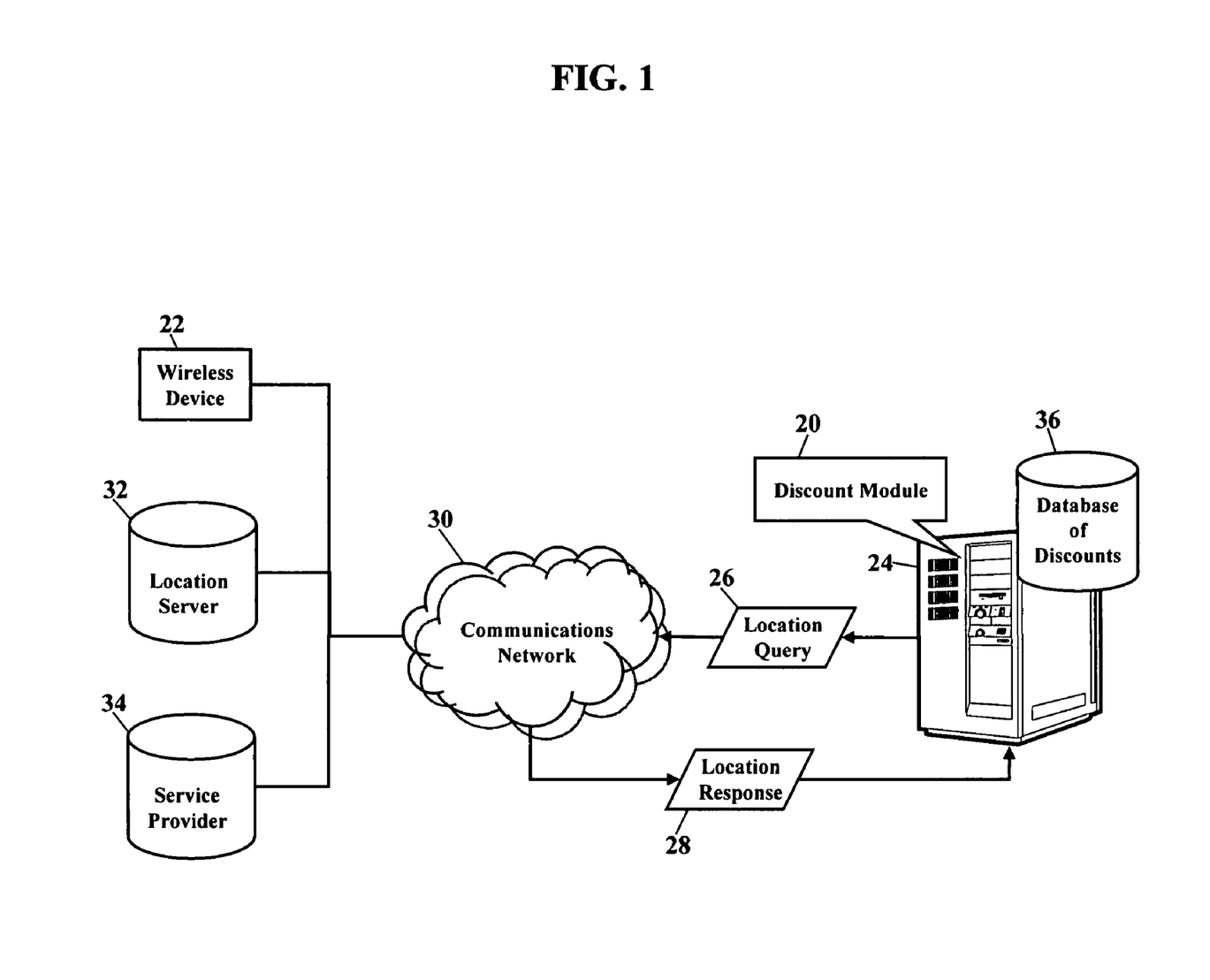
FIGS. 1 and 2 are schematics illustrating the exemplary embodiments.
Figure 2:
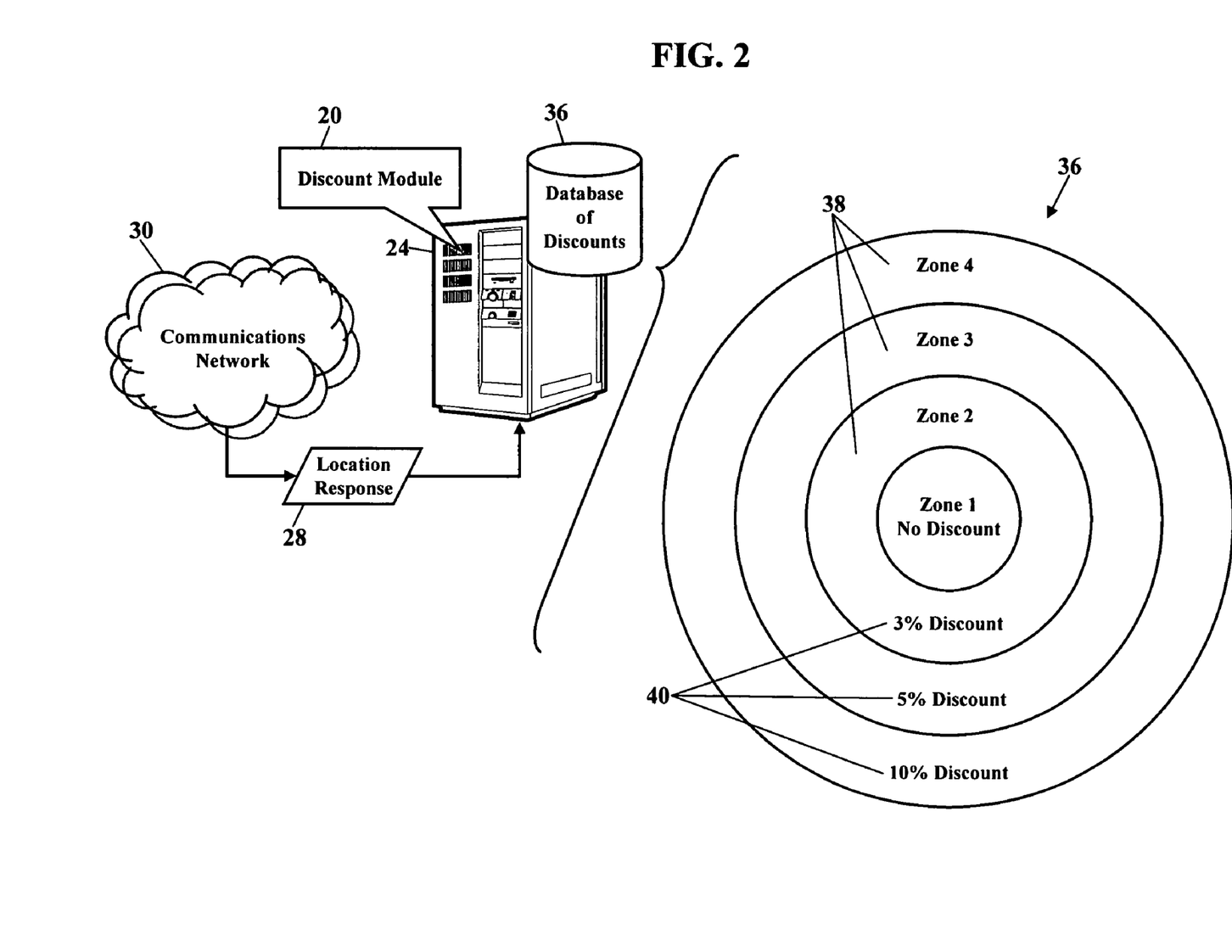

FIGS. 1 and 2 are schematics illustrating the exemplary embodiments. A discount module 20 comprises methods, systems, computer programs, and/or computer program products that provide a discount based on a location of a wireless device 22. The discount module 20 operates within any computer system, such as a computer server 24. The discount module 20 issues a location query 26 to determine the location of the wireless device 22. The discount module 20 then receives a location response 28, and the location response 28 includes information that represents the location of the wireless device 22. The location response 28 may represent the current location of the wireless device 22, or the location response 28 may represent a recent location of the wireless device 22. Both the location query 26 and the location response 28 communicate via a communications network 30. The communications network 30 may be a distributed computing network, such as the Internet (sometimes alternatively known as the "World Wide Web"), an intranet, a local-area network (LAN), and/or a wide-area network (WAN). The communications network 30 may alternatively or additionally include a cable network operating in the radio-frequency domain and/or the Internet Protocol (IP) domain. The communications network 30, however, may also include portions of the Public Switched Telephone Network (PSTN). The communications network 30 may include coaxial cables, copper wires, fiber optic lines, and/or hybrid-coaxial lines. The communications network 30 may even include wireless portions utilizing any portion of the electromagnetic spectrum and any signaling standard (such as the various cellular standards CDMA, TDMA, GSM, and/or the I.E.E.E. 802 family of standards).

The discount module 20 obtains the location of the wireless device 22. The location query 26 may communicate to a location server 32. The location server 32 is a computer system and/or a database that stores location information for the wireless device 22. The location query 26 may additionally or alternatively communicate to a service provider 34 for the location of the wireless device 22. The location query 26 may additionally or alternatively query the wireless device 22 for its current or recent location. The location of the wireless device 22 may be determined using a global positioning system, triangulation, timed signals, and/or the Doppler effect. The Doppler effect describes motion between a time-harmonic source and a receiver, is known in the art, and thus will not be further explained. If the reader wishes to learn more about the Doppler effect, the reader is directed to DAVID K. CHENG, FIELD AND WAVE ELECTROMAGNETICS 360-361 (1990). How the location of the wireless device is determined is beyond the scope of this patent. Those of ordinary skill in the art recognize that various methods of locating the wireless device 22 are known and will not be further discussed.

However the location of the wireless device 22 is determined, the discount module 20 obtains the location of the wireless device 22. The discount module 20 receives the location response 28 via the communications network 30. The location response 28 includes information that represents the location of the wireless device 22. Once the location of the wireless device 22 is known, the discount module 20 then retrieves the appropriate discount 36. The discount 36 is based on the location, such that the discount 36 increases as a distance from a reference location increases. When the reference location represents a merchant's physical location (e.g., a grocery store, a retailer's store, a movie cinema, etc.), the merchant provides the discount 36 based on the distance between the wireless device 22 and the merchant's physical location. As the wireless device 22 travels further from the reference location (e.g., the merchant's physical location), the merchant provides a greater discount. The discount 36 is meant to entice the wireless customer to travel to the merchant's physical location and make purchases. The farther the customer must travel, the greater the discount the merchant provides.

FIG. 2 is a schematic illustrating retrieval of the discount 36. FIG. 2 illustrates geographic zones 38 and corresponding discounts 40. The discount module 20 first determines which zone represents the location of the wireless device. Each zone then corresponds to a particular discount. When the reference location corresponds to a merchant's physical location, those zones that are further from the merchant's store are assigned a greater discount. The discount 36 is based on the location, such that the discount 36 increases as the distance from the merchant's store increases. As the wireless device (shown as reference numeral 22 in FIG. 1) travels further from the reference location (e.g., the merchant's physical location), the merchant provides a greater discount. The discounts 40 entice the wireless customer to travel to the merchant's physical location and make purchases. The farther the customer must travel, the greater the discount.

Figure 3:
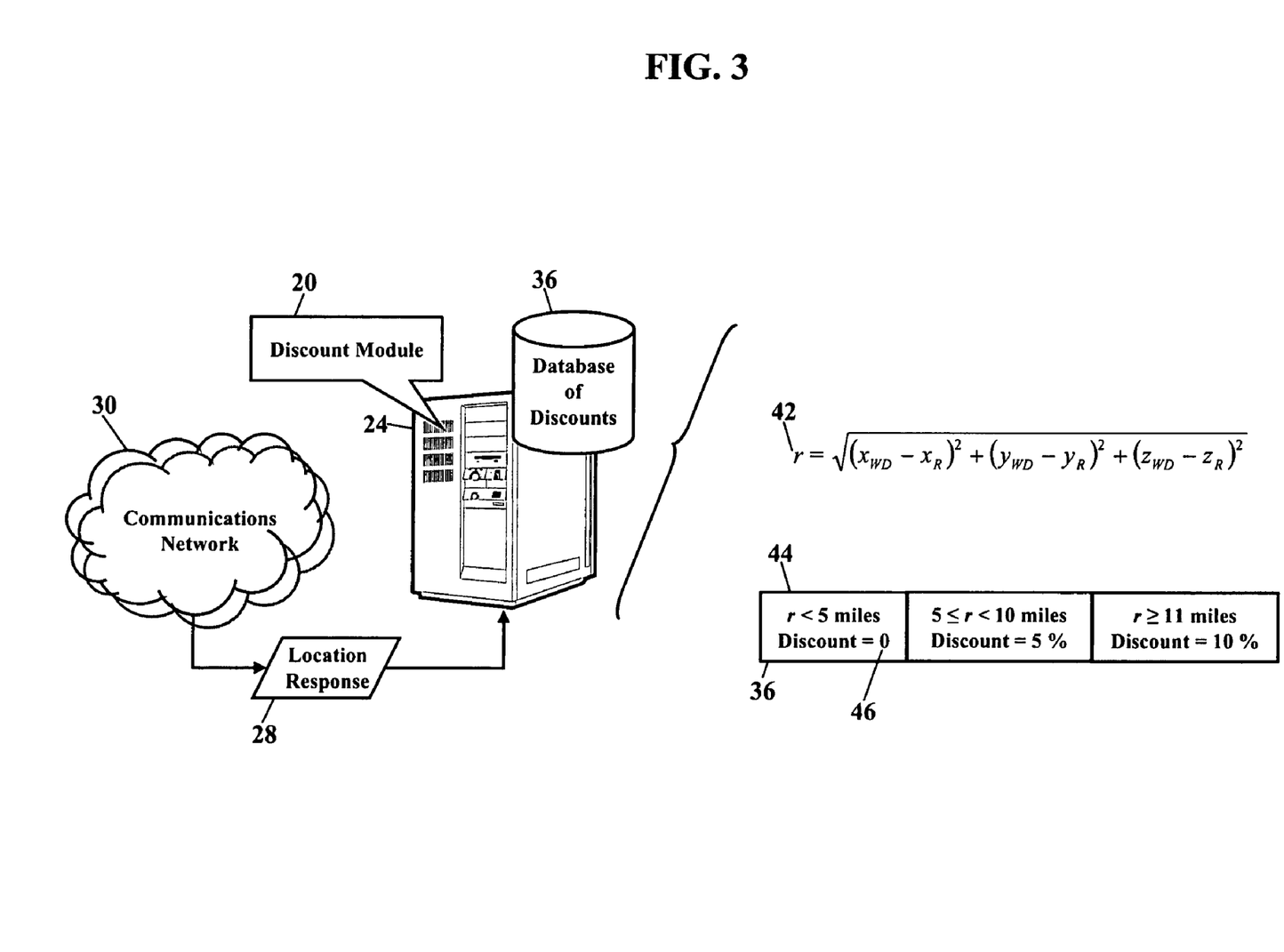
FIGS. 3-6 are schematics further illustrating retrieval of a discount.

FIG. 3 further illustrates retrieval of the discount 36. Here the discount module 20 computes a distance r (shown as reference numeral 42) between the reference location and the location of the wireless device. The location of the reference location is represented by the coordinates $(X_R, Y_R, Z_R)$. The location of the wireless device is represented by the coordinates $(X_{WD}, Y_{WD}, Z_{WD})$. The coordinates may be grid coordinates. The coordinates may be latitude, longitude, and elevation (such as altitude or azimuth). The coordinates may be expressed in any x, y, and z coordinate value. These coordinates may be expressed in U.S. Customary and British Imperial units, such as feet and miles, or in metric units, such as meters and kilometers. The coordinates could also be expressed as position, velocity, and time coordinates. However the coordinates are expressed, the discount module 20 computes the distance r between the corresponding coordinates. Although many methods may be used to compute the distance r, the distance r may be simply computed using $$r = \sqrt{\Delta x^2 + \Delta y^2 + \Delta z^2}.$$

See FRANCIS W. SEARS ET AL., UNIVERSITY PHYSICS 10-11 (1976). Substituting the respective coordinates, the distance r between the reference location and the location of the wireless device may be computed using $$r = \sqrt{(X_{WD} - X_R)^2 + (Y_{WD} - Y_R)^2 + (Z_{WD} - Z_R)^2}.$$

FIG. 3 also illustrates a data table 44. The data table 44 maps the distance r (between the reference location and the location of the wireless device) to a corresponding discount 46. Once the discount module 20 computes the distance r (shown as reference numeral 42), the discount module 20 consults the data table 44 and retrieves the appropriate discount 46. Again, as the wireless device (shown as reference numeral 22 in FIG. 1) travels further from the reference location (e.g., the merchant's physical location), the merchant provides a greater discount. The discounts 46 entice the wireless customer to travel to the merchant's physical location and make purchases. The farther the customer must travel, the greater the discount.

Figure 4:
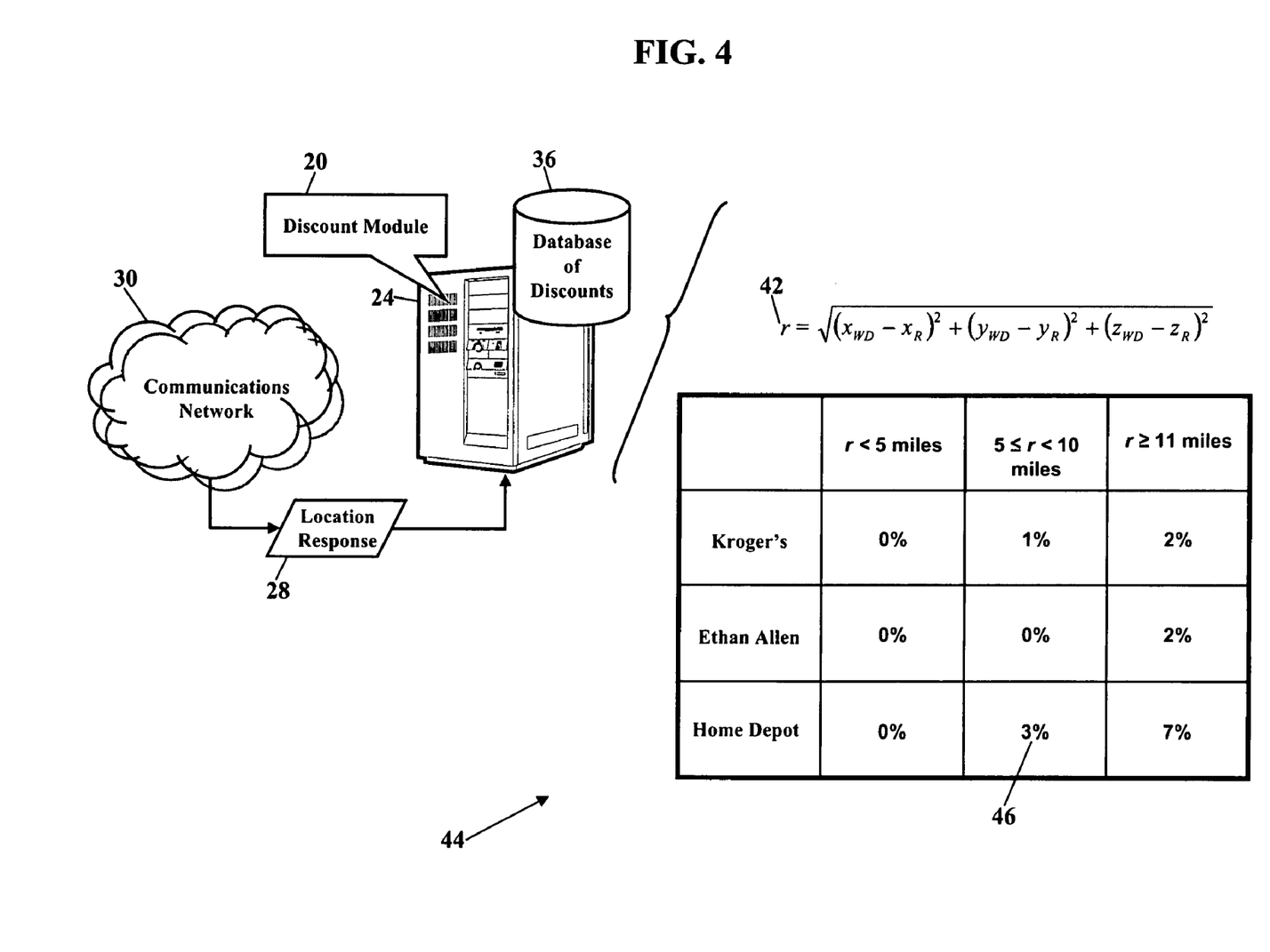

FIG. 4 is another schematic illustrating retrieval of discounts. FIG. 4 is similar to FIG. 3, although FIG. 4 illustrates that discounts may be retrieved for multiple reference locations. Here the data table 44 illustrates discounts for multiple merchants. When the discount module 20 obtains the location of the wireless device (via the location response shown as reference numeral 28 in FIG. 1), the discount module 20 computes the distance r between multiple reference locations and the location of the wireless device. Using the previous examples, multiple merchants may provide discounts based on distance. The discount module 20 computes the distance r to each merchant's physical location. The discount module 20 then consults the data table 44 and retrieves the appropriate discount 46 for each merchant. The farther the customer must travel, the greater the discount. This example lends itself to a cluster of merchants, such as shopping mall, which want to entice the wireless customer to travel and to make purchases.

Figure 5:
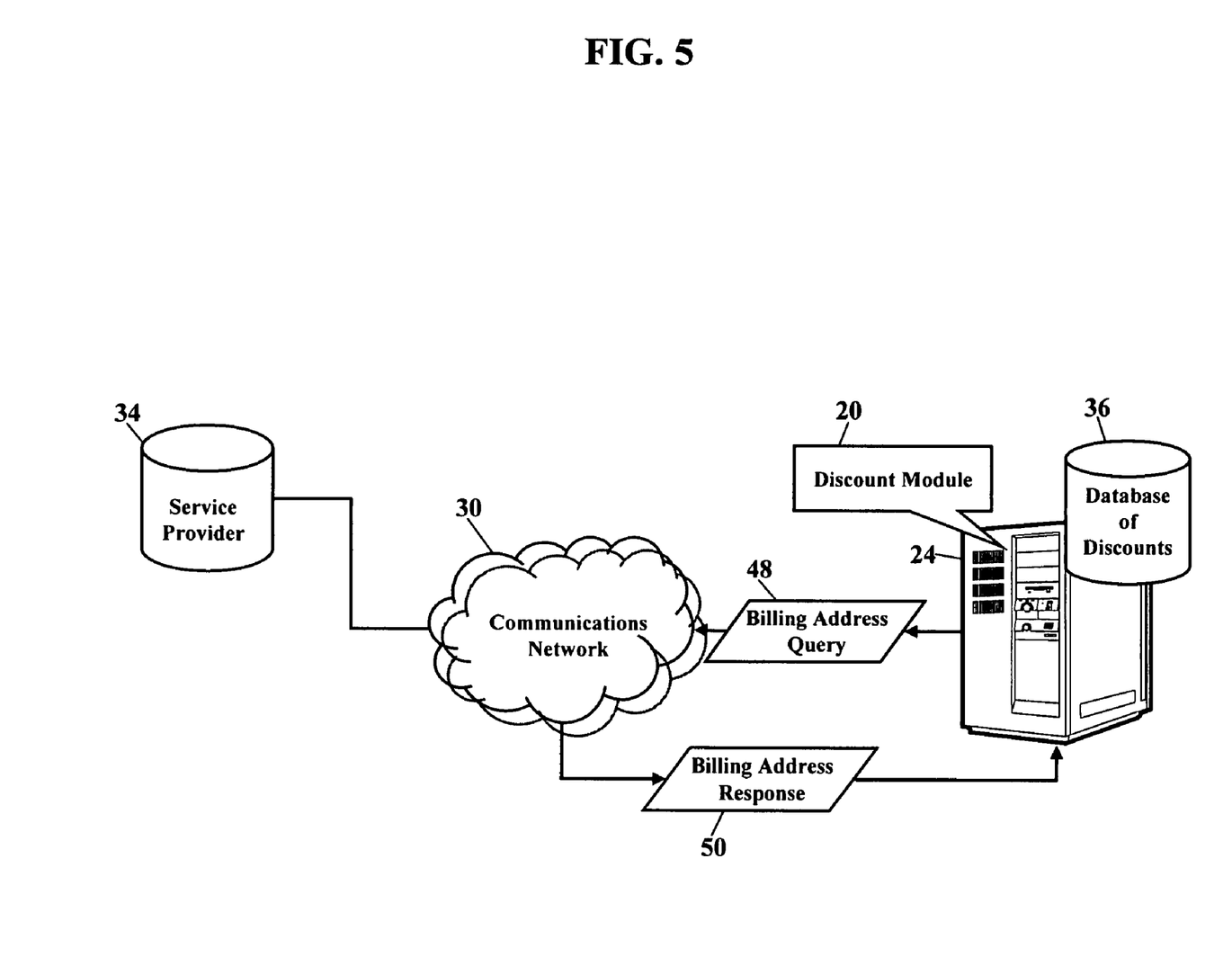

FIG. 5 is another schematic illustrating retrieval of discounts. Here, however, the discounts are at least partly associated with a billing address associated with the wireless device. When the discount module 20 issues the location query (shown as reference numeral 26 in FIG. 1) to determine the location of the wireless device 22, the discount module 20 also issues a billing address query 48. The billing address query 48 communicates via the communications network 30 to the service provider 34 for the billing address associated with the wireless device 22. The billing address query 48 may additionally or alternatively communicate via the communications network 30 to the wireless device 22 itself, wherein the wireless device 22 self-provides the billing address. However the billing address is obtained, a billing address response 50 is received. The billing address response 50 contains information that represents the billing address associated with the wireless device 22.

Now that the billing address is known, the billing address may be used to determine if a discount is needed. If the billing address has a particular zip code, street address, or city, that information can be used to select the discount. If, for example, the billing address indicates a wealthy demographic, perhaps no discount is needed to entice the wireless customer. If, on the other hand, the billing address indicates a less affluent demographic, the current location information may be discounted, or even discarded, when retrieving the discount. A domestic worker, such as a housekeeper or groundskeeper, may have a wealthy current location, however, a needy billing address. The merchant may thus elect to provide a discount based partly, or even solely, on the distance between the billing address and the merchant's physical location.

The billing address may also be used to decline a discount. When the billing address indicates a wealthy demographic, as mentioned above, no discount may be needed to entice the wireless customer. If, however, the billing address is close to a competitor's store, the merchant may determine that the discount has little effect. Perhaps the wireless customer will always shop the competitor's closer location, so only an unusually large discount would entice the customer. Moreover, the necessary discount may erase any profitability, and/or the expense of offering the discount is greater that the potential profit. For whatever reason(s), the billing address may be used to decline a discount.

Figure 6:
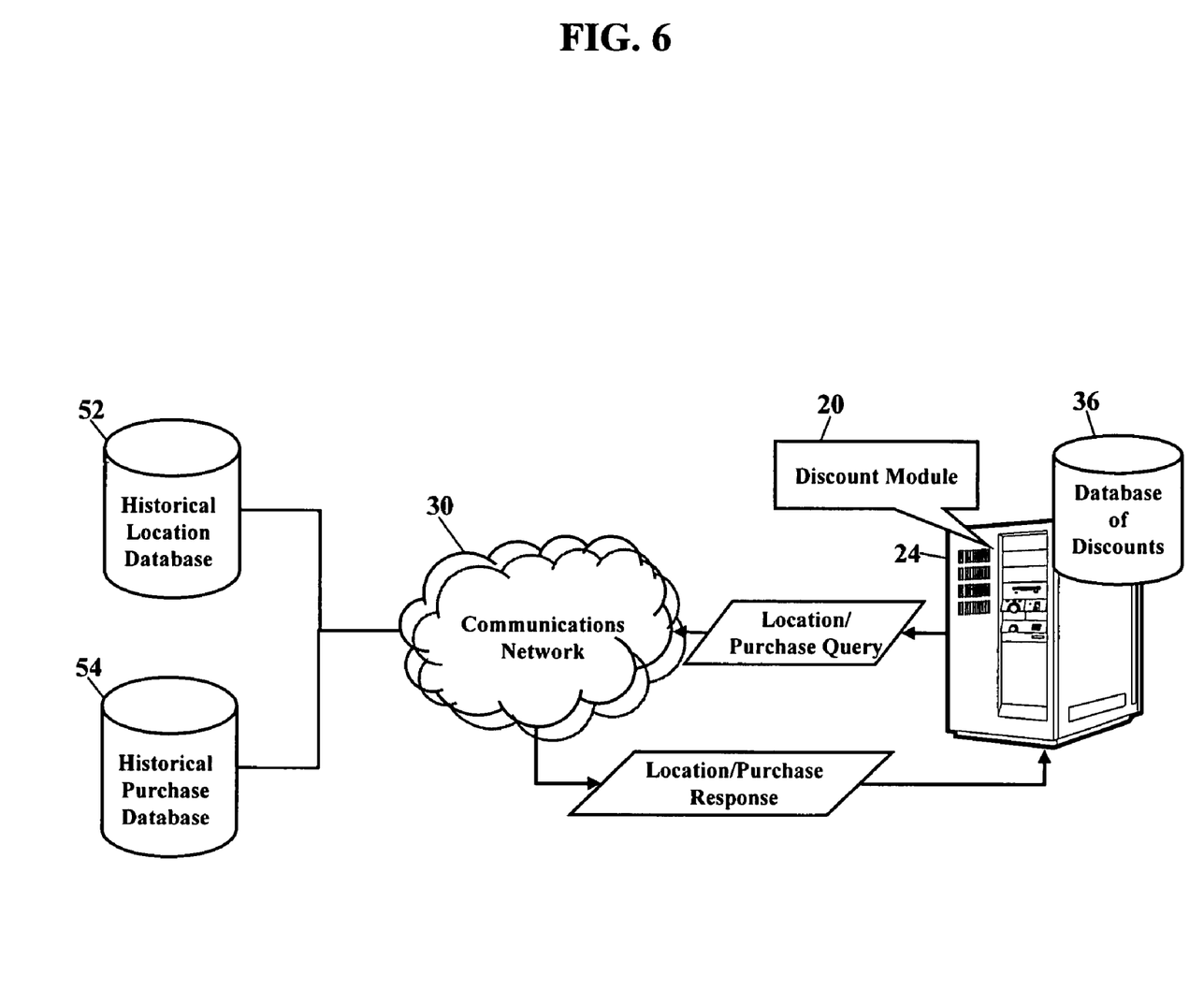

FIG. 6 is another schematic illustrating retrieval of discounts. Here, however, the discounts are at least partly associated with historical location information and/or historical purchase information. If the wireless device has before been in the merchant's store, that historical location information may be useful to the merchant. That historical location information may be used to identify the customer's purchasing trends. Similarly, the customer's historical purchase information may indicate purchasing trends. If the wireless device's historical location information indicates a frequent customer, perhaps no discount, or a smaller discount, is desired. Likewise, the historical purchase information may indicate a frequent customer, so the merchant's discount strategy may change.

FIG. 6, then, illustrates obtaining historical location information and/or historical purchase information associated with the wireless device (shown as reference numeral 22 in FIG. 1). When the discount module 20 receives the location response (shown as reference numeral 28 in FIG. 1) (representing the location of the wireless device 22), the discount module 20 may also query a historical location database 52 and/or a historical purchase database 54. The historical location database 52 stores information representing a proximity of the wireless device to the reference location. The historical location database 52 stores one or more occasions when a location of the wireless device matches, or is within a predetermined range, of the reference location. The historical purchase database 54 stores information representing historical purchases associated with the wireless device, the billing address, and/or the wireless customer. By querying one or both of these databases, the merchant can refine their pricing strategy based on each individual customer.

Figure 7:
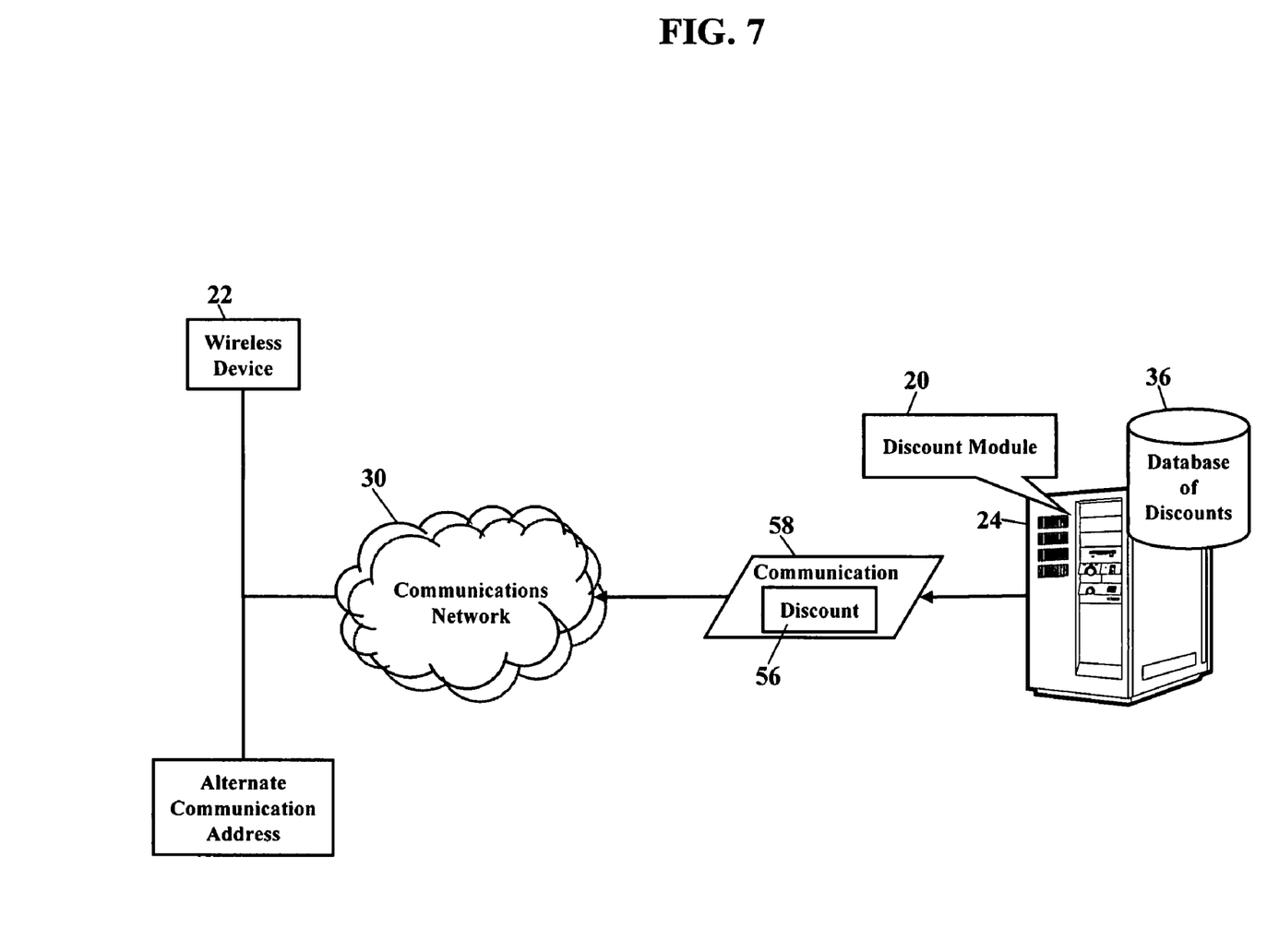
FIG. 7 is a schematic illustrating delivery of the discount.

FIG. 7 is a schematic illustrating delivery of the discount. Once the appropriate discount is retrieved, the discount module 20 then communicates that discount 56 to the customer. The discount module 20 addresses a communication 58 to the customer. The communication 58 contains the retrieved discount. (If the discount module determines that no discount is necessary, then perhaps no communication is needed.) The communication may be an email, a text message, an instant message, a telephone call, and/or an Internet Protocol telephone call. The communication 58 may communicate via the communications network 30 to the wireless device 22. The communication 58, however, may additionally or alternatively communicate via the communications network 30 to an alternate communications address associated with the wireless customer and/or the wireless device (such as an email account, a pager address, or a telephone number). The communication 58 may also include a direct mail solicitation to the billing address associated with the wireless device.

Figure 8:
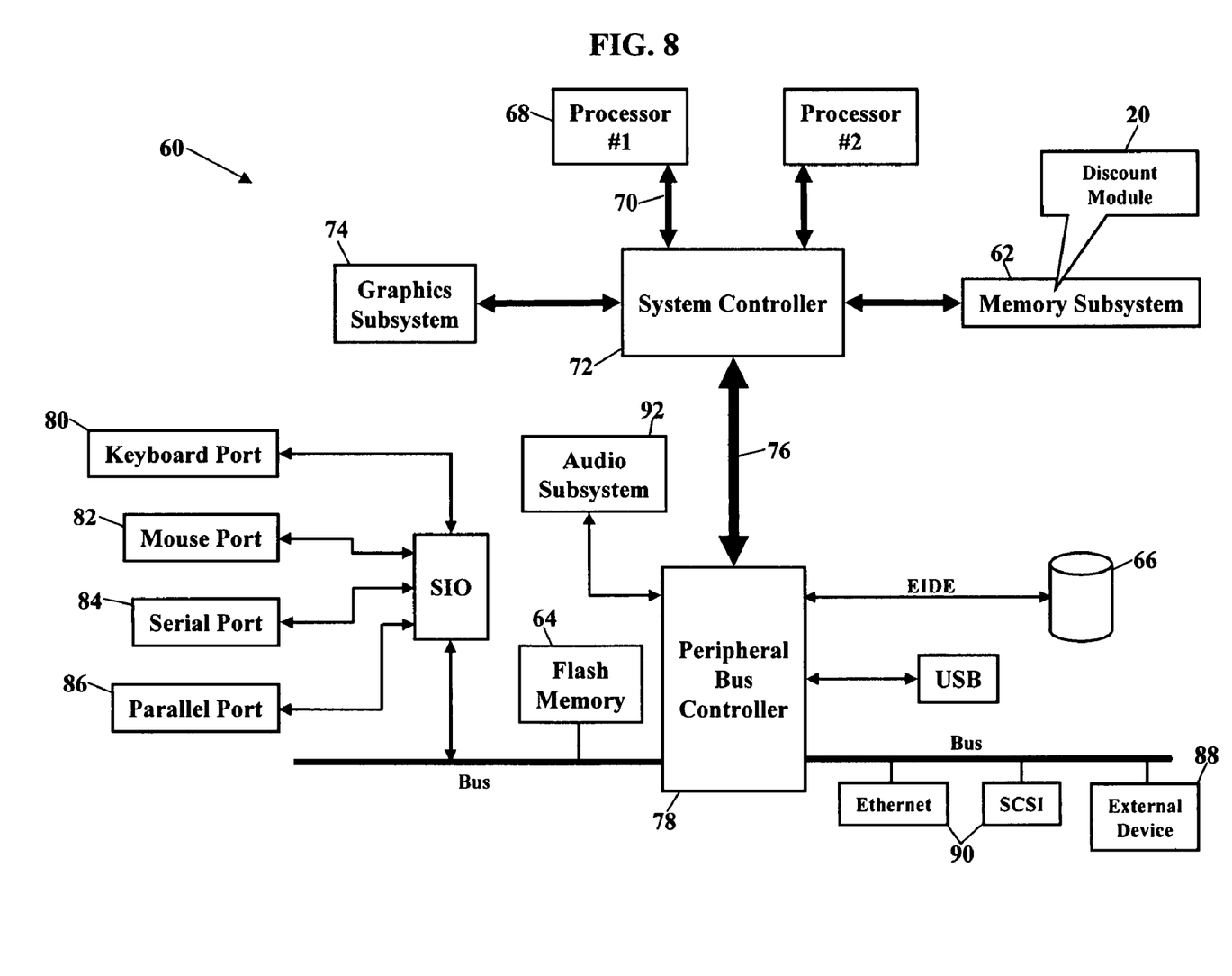
FIG. 8 depicts another possible operating environment for the exemplary embodiments.

FIG. 8 depicts another possible operating environment for the exemplary embodiments. FIG. 8 is a block diagram showing the discount module 20 residing in a computer system 60. The computer system 60 may be any computing system, such as the computer server (shown as reference numeral 24 in FIGS. 1-7), an IP network element such as an IP router/switch/hub/gateway/proxy, or any other computer device. As FIG. 8 shows, the discount module 20 operates within a system memory device. The discount module 20, for example, is shown residing in a memory subsystem 62. The discount module 20, however, could also reside in flash memory 64 or a peripheral storage device 66, or in firmware or hardware, or in any combination. The computer system 60 also has one or more central processors 68 executing an operating system. The operating system, as is well known, has a set of instructions that control the internal functions of the computer system 60. A system bus 70 communicates signals, such as data signals, control signals, and address signals, between the central processor 68 and a system controller 72 (typically called a "Northbridge"). The system controller 72 provides a bridging function between the one or more central processors 68, a graphics subsystem 74, the memory subsystem 62, and a PCI (Peripheral Controller Interface) bus 76. The PCI bus 76 is controlled by a Peripheral Bus Controller 78. The Peripheral Bus Controller 78 (typically called a "Southbridge") is an integrated circuit that serves as an input/output hub for various peripheral ports. These peripheral ports are shown including a keyboard port 80, a mouse port 82, a serial port 84 and/or a parallel port 86 for a video display unit, one or more external device ports 88, and networking ports 90 (such as SCSI or Ethernet). The Peripheral Bus Controller 78 also includes an audio subsystem 92. Those of ordinary skill in the art understand that the program, processes, methods, and systems described in this patent are not limited to any particular computer system or computer hardware.

Those of ordinary skill in the art also understand the central processor 68 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

A preferred operating system, according to an exemplary embodiment, is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Example operating systems of IP network elements including IP routers/switches/hubs/gateways/proxies include Cisco IOS (Internet Operating System), Vxworks, various proprietary OS's, and variations of UNIX. Those of ordinary skill in the art again understand that the program, processes, methods, and systems described herein are not limited to any particular operating system.

The system memory device (shown as memory subsystem 62, flash memory 64, or peripheral storage device 66) may also contain an application program. The application program cooperates with the operating system and with a video display unit (via the serial port 84 and/or the parallel port 86) to provide a Graphical User Interface (GUI). The Graphical User Interface typically includes a combination of signals communicated along the keyboard port 80 and the mouse port 82. The Graphical User Interface provides a convenient visual and/or audible interface with a user of the computer system 60.

The discount module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ®) are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the claims, allow the discount module to be easily disseminated. A computer program product providing a discount to a wireless device comprises a computer readable medium including instructions. These instructions obtain a location of the wireless device and retrieve the discount from memory. The discount is based on the location, and the discount increases as a distance from a reference location increases.

Figure 9:
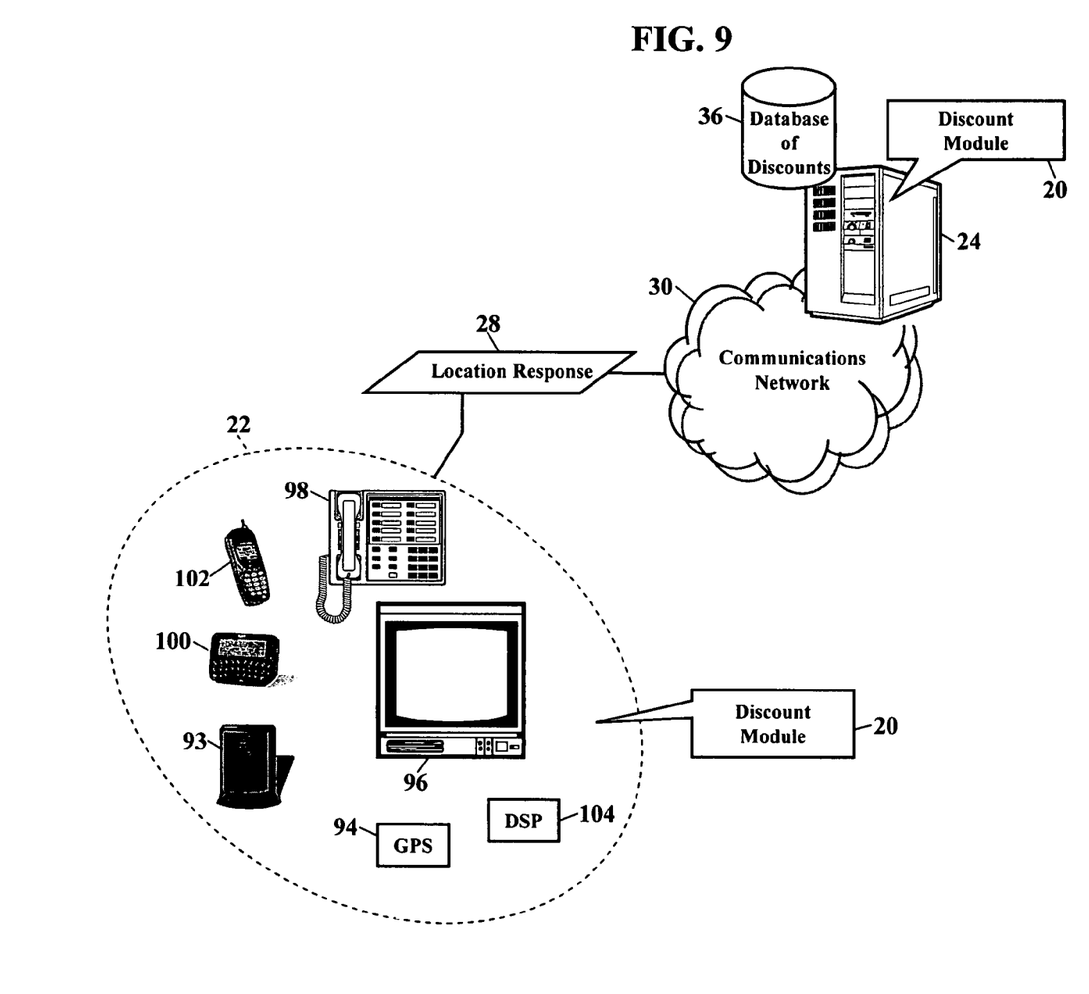
FIG. 9 is a schematic illustrating various wireless devices embodying the exemplary embodiments.

FIG. 9 is a schematic illustrating still more embodiments. FIG. 9 illustrates that the discount module 20 may alternatively or additionally operate within various wireless devices. As FIG. 9 shows, the discount module 20 may operate in a personal digital assistant (PDA) 93, a Global Positioning System (GPS) device 94, an interactive television 96, an Internet Protocol (IP) phone 98, a pager 100, a cellular/satellite phone 102, or any computer system and/or communications device utilizing a digital signal processor (DSP) 104. The wireless device may also include watches, radios, vehicle electronics, clocks, printers, gateways, and other apparatuses and systems. The discount module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

Figure 10:
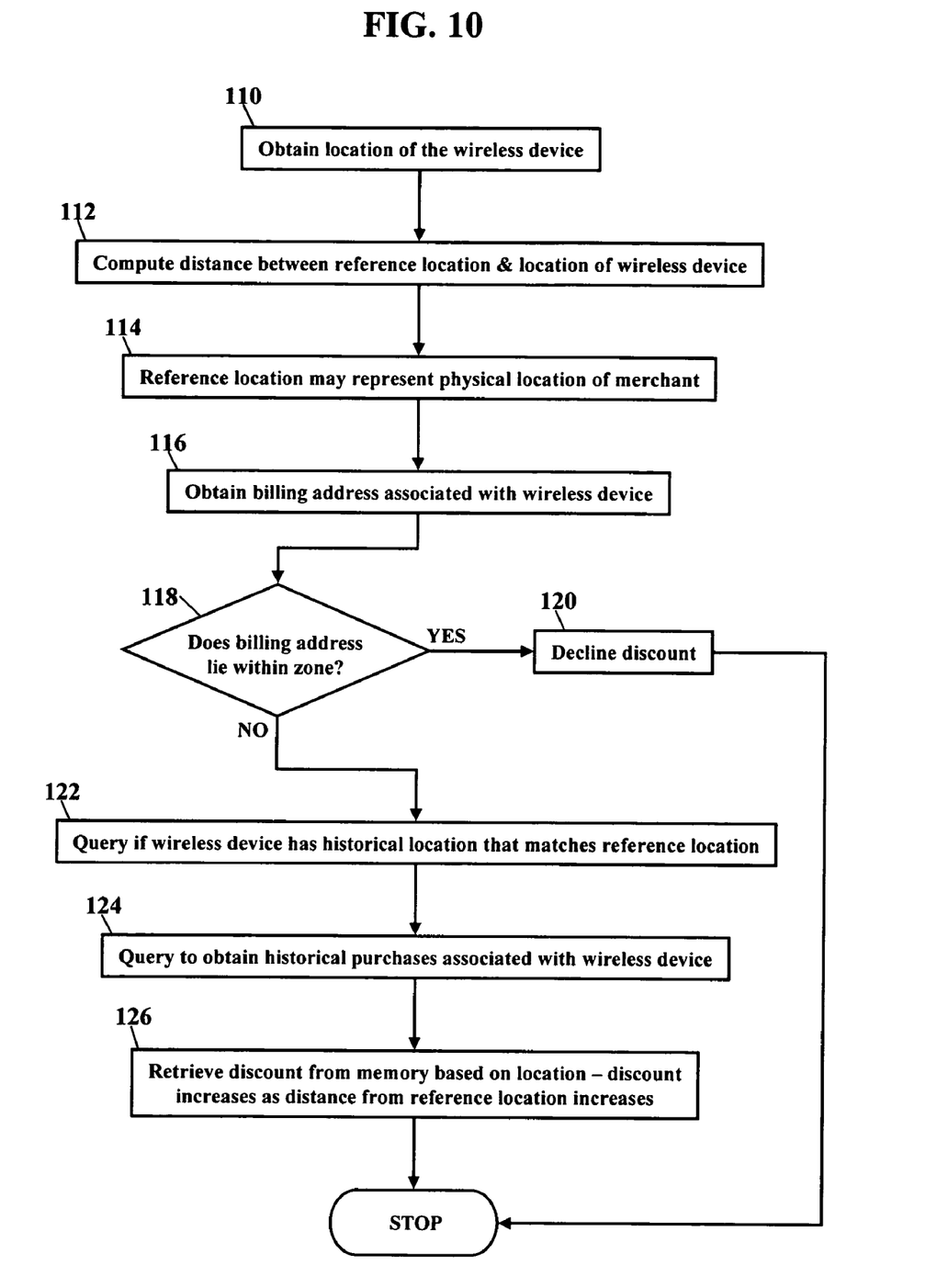
FIG. 10 is a flowchart illustrating a method of providing a discount to a wireless device.

FIG. 10 is a flowchart illustrating a method of providing a discount to a wireless device. A location of the wireless device is obtained (Block 110). The distance between a reference location and the location of the wireless device is computed (Block 112). The reference location may represent a physical location of a merchant (Block 114). A billing address associated with the wireless device is obtained (Block 116). If the billing address lies within a predetermined zone (Block 118), then the merchant may decline to provide the discount (Block 120). One or more queries may determine if the wireless device has a historical location that matches the reference location (Block 122). One or more queries may obtain historical purchases associated with the wireless device (Block 124). A discount is retrieved from memory (Block 126). The discount is based on the location of the wireless device. The discount increases as a distance from a reference location increases.

While exemplary embodiments of the present invention have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A system for providing a discount to a wireless device, the system comprising:
a processor executing code stored in memory that causes the processor to:
obtain a location of the wireless device;
obtain a billing address and a zone improvement plan code associated with the device;
compute a distance from a reference location to the location of the wireless device;
query a historical location database to determine if the wireless device has a historical location that matches the reference location, the historical location database storing information representing a proximity of the wireless device to the reference location, the historical location database storing one or more occasions when the location of the wireless device is within a predetermined range of the reference location;
decline to provide the discount when the historical location frequently matches the reference location;
decline to provide the discount when the billing address and the zone improvement plan code indicates wealth;
retrieve the discount from memory based only on the distance between the reference location and on the location of the wireless device when the historical location does not match the reference location and when the billing address and the zone improvement plan code do not indicate wealth; and
increase the discount as the distance from the reference location increases.

2. The system according to claim 1, further comprising instructions that cause the processor to map the distance to the discount.

3. The system according to claim 1, further comprising instructions that cause the processor to compute the distance using position coordinates.

4. The system according to claim 1, wherein when the location indicates wealth, and the billing address indicates a less affluent demographic, then further comprising instructions that cause the processor to discount the location when retrieving the discount.

5. The system according to claim 4, wherein if the billing address lies within a predetermined zone, then further comprising instructions that cause the processor to decline to provide the discount.

6. The system according to claim 1, further comprising instructions that cause the processor to query for the location of the wireless device.

7. The system according to claim 1, further comprising instructions that cause the processor to compute the distance using at least one of position, velocity, and time coordinates.

8. The system according to claim 1, further comprising instructions that cause the processor to query for historical purchases associated with the wireless device.

9. A computer program product comprising a computer readable medium storing processor executable instructions that, when executed by a processor, perform a method of providing a discount to a wireless device, the method comprising:
obtaining a location of the wireless device;
obtaining a billing address and a zone improvement plan code associated with the device;
computing a distance from a reference location to the location of the wireless device;
querying a historical location database to determine if the wireless device has a historical location that matches the reference location, the historical location database storing information representing a proximity of the wireless device to the reference location, the historical location database storing one or more occasions when the location of the wireless device is within a predetermined range of the reference location;
declining to provide the discount when the historical location frequently matches the reference location;
declining to provide the discount when the billing address and the zone improvement plan code indicates wealth;

retrieving the discount from memory based only on the distance between the reference location and on the location of the wireless device when the historical location does not match the reference location and when the billing address and the zone improvement plan code do not indicate wealth; and increasing the discount as the distance from the reference location increases.

10. The computer program product according to claim 9, further comprising instructions for mapping the distance to the discount.

11. The computer program product according to claim 9, further comprising instructions for computing the distance using at least one of position, velocity, and time coordinates.

12. The computer program product according to claim 9, further comprising instructions for when the location indicates wealth, and the billing address indicates a less affluent demographic, then discounting the location when retrieving the discount.

13. A method of providing a discount to a wireless device, comprising:

obtaining a location of the wireless device;

obtaining a billing address and a zone improvement plan code associated with the device;

computing a distance from a reference location to the location of the wireless device;

querying a historical location database to determine if the wireless device has a historical location that matches the reference location, the historical location database storing information representing a proximity of the wireless device to the reference location, the historical location database storing one or more occasions when the location of the wireless device is within a predetermined range of the reference location;

declining to provide the discount when the historical location frequently matches the reference location;

declining to provide the discount when the billing address and the zone improvement plan code indicates wealth;

retrieving the discount from memory based only on the distance between the reference location and on the location of the wireless device when the historical location does not match the reference location and when the billing address and the zone improvement plan code do not indicate wealth; and increasing the discount as the distance from the reference location increases.

14. The method according to claim 13, further comprising mapping the distance to the discount.

15. The method according to claim 13, further comprising computing the distance using position coordinates.

16. The method according to claim 13, wherein when the location indicates wealth, and the billing address indicates a less affluent demographic, then further comprising discounting the location when retrieving the discount.

17. The method according to claim 13, wherein if the billing address lies within a predetermined zone, then further comprising declining to provide the discount.

18. The method according to claim 13, further comprising querying for the location of the wireless device.

19. The method according to claim 13, further comprising computing the distance using at least one of position, velocity, and time coordinates.

20. The method according to claim 13, further comprising querying to obtain historical purchases associated with the wireless device.

\* \* \* \* \*